Feb. 5, 1935. H. W. ALDEN ET AL 1,990,016
RESILIENT JOINT
Filed Oct. 29, 1932
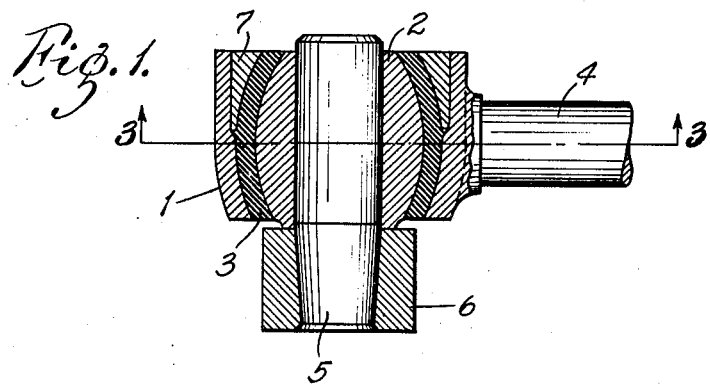
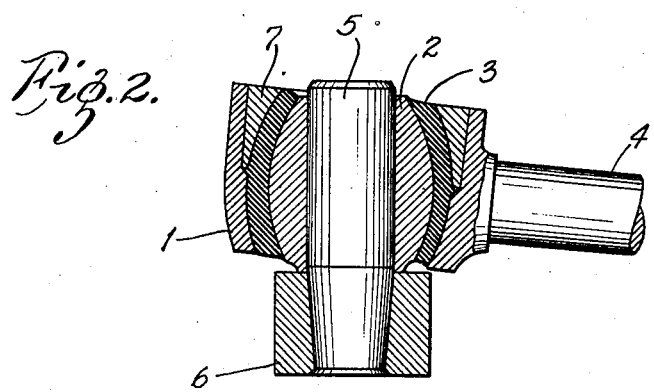
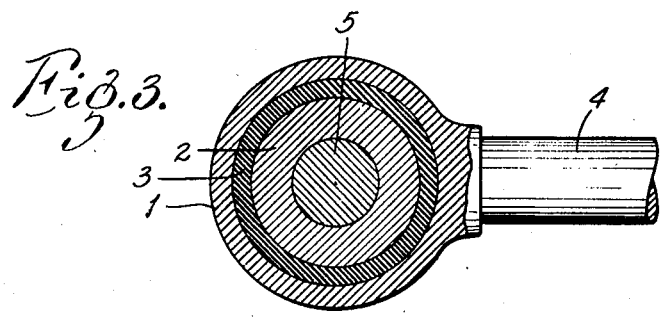
INVENTORS:
Herbert W. Alden and
Lawrence R. Buckendale,
by Carr & Carr & Gravely,
THEIR ATTORNEYS.

Patented Feb. 5, 1935

1,990,016

UNITED STATES PATENT OFFICE 1,990,016

RESILIENT JOINT

Herbert W. Alden and Laurence R. Buckendale, Detroit, Mich., assignors to The Timken-Detroit Axle Company, Detroit, Mich., a corporation of Ohio Application October 29, 1932, Serial No. 640,238

2 Claims. (Cl. 287—85)

This invention relates to resilient joints, particularly resilient universal joints of the type wherein the two members of the joints are connected by a sleeve of rubber, or analogous material, which allows relative movement of said members by internal deformation of the rubber. It has for its principal objects to provide for simplicity and cheapness of construction of such joints, to facilitate assembly of the parts of the joint, to prevent wear on the rubber sleeve, to reduce the number of parts, to provide for compactness of design and to obtain other advantages hereinafter appearing.

The invention consists in the parts and in the combinations and arrangements of parts hereinafter described and claimed.

In the accompanying drawing, which forms part of this specification and wherein like symbols refer to like parts wherever they occur, Fig. 1 is an axial section through a resilient joint embodying our invention, Fig. 2 is a view similar to Fig. 1, showing the position of the parts when relative angular movement occurs therebetween; and Fig. 3 is a transverse section through the joint on the line 3—3 in Fig. 1.

The present resilient universal joint comprises a metallic outer member or shell 1, a metallic inner member 2 located within said shell and a sleeve 3 of rubber or other analogous material interposed between said outer shell and said inner member and bonded to the latter preferably by vulcanization. The outer member or shell 1 of the joint is preferably provided with a radially extending arm 4; and the inner member 2 is provided with an axial bore within which is press-fitted one end of a pin 5 whose opposite end is rigidly mounted in a suitable fixture or arm 6. In the process of assembling the joint, the rubber sleeve 3 is crowded into place, thereby compressing the rubber between the metallic outer and inner members 1 and 2, respectively, of the joint. The compressed rubber sleeve 3 is preferably held in position by means of a metallic retaining ring 7 of wedge-shaped cross-section that is pressed into one end of the outer shell 1. By the arrangement described, the compressed rubber sleeve 3 is bonded to the inner joint member 2 and frictionally adheres to the outer joint member 1 so that relative movement of said joint members is accommodated by internal deformation of the rubber and not by slipping or rubbing of the rubber upon said members.

As shown in the drawing, the inner joint member 2 is substantially barrel-shaped in axial section; and likewise, the inner surfaces of the outer joint member 1 and the retaining ring 6 are curved to correspond to the curvature of the peripheral surface of said inner joint member. As shown in the drawing, the longitudinal convex peripheral curvature of the inner joint member has a radius that is greater than the semi-diameter thereof; and likewise, the radius of curvature of the longitudinal inner periphery of the outer joint member is greater than the distance between said periphery and the center of the joint. By this arrangement, a maximum area of surface contact is obtained between the rubber sleeve and the two joint members with an inner joint member of minimum diameter, and a center pin of maximum diameter may be used with an inner joint member having a given outside diameter. In the operation of the joint, all relative movement of the two joint members are entirely sustained by the deformation of the rubber sleeve and without slipping or rubbing of the latter on said joint members. When the relative oscillatory movement of the two joint members is in the plane of the longitudinal axis of the joint, as shown in Fig. 2, the diagonally opposite end portions of the outer joint member move towards the corresponding end portions of the inner joint member and thus slightly compress the portions of the rubber sleeve therebetween, while the other diagonally opposite end portions of said outer joint member move away from the corresponding end portions of said inner joint member and thus permit the portions of the rubber sleeve therebetween to expand slightly.

Obviously, the hereinbefore described universal joint construction admits of considerabl modification without departing from the invention. Therefore, we do not wish to be limited to the precise construction shown and described.

What we claim is:

1. In a joint construction, an inner joint member having a convex bearing face, said convex bearing face being generated by rotating a curvilinear line about the axis of said inner joint member, the radius of curvature of said curvilinear line being considerably greater than the greatest distance of the latter from the axis of said inner joint member; an outer joint member surrounding said inner joint member and having an inner concave bearing face cooperating with said convex bearing face to provide a curved, substantially parallel-walled, annular recess between said inner and outer joint members; and a deformable element disposed between said inner and outer joint members and engaging said convex and concave bearing faces, said deformable element being adhesively secured to at least a portion of said convex bearing face, and said inner and outer joint members being completely isolated by said deformable element, whereby said outer joint member may undergo rocking movement with respect to said inner joint member in planes parallel to the axis thereof and may also rock about relatively to said inner joint member about the axis thereof.

2. The joint construction described in claim 1, wherein the radius of curvature of said curvilinear line is substantially equal to the greatest diameter of said inner joint member.

HERBERT W. ALDEN.
LAURENCE R. BUCKENDALE.